(No Model.)

B. BLAKE.
DRIVING REIN AND TAIL HOLDER.

No. 507,476. Patented Oct. 24, 1893.

WITNESSES:
Fred G. Dieterich
Edw. W. Byrn.

INVENTOR
Burdine Blake.
BY Munn & Co.
ATTORNEYS.

UNITED STATES PATENT OFFICE.

BURDINE BLAKE, OF LONDON, OHIO.

DRIVING-REIN AND TAIL-HOLDER.

SPECIFICATION forming part of Letters Patent No. 507,476, dated October 24, 1893.

Application filed June 8, 1893. Serial No. 476,958. (No model.)

*To all whom it may concern:*

Be it known that I, BURDINE BLAKE, of London, in the county of Madison and State of Ohio, have invented a new and useful Improvement in Driving-Reins and Tail-Holders, of which the following is a specification.

The object of the invention is to provide a combined driving rein and tail holder to be applied to the harness of a horse to prevent the horse from getting his tail over the reins, which is a frequent source of annoyance to the driver, especially in the fly season.

It consists in an attachment of peculiar construction which may be incorporated in and form a part of the harness, or be applied to the harness already in use, whereby the reins are held in suitable guides, and a depending guard or fender is provided which prevents the horse's tail from rising to a point where it might become entangled in the reins, all as hereinafter fully described.

Figure 1:
Figure 2:
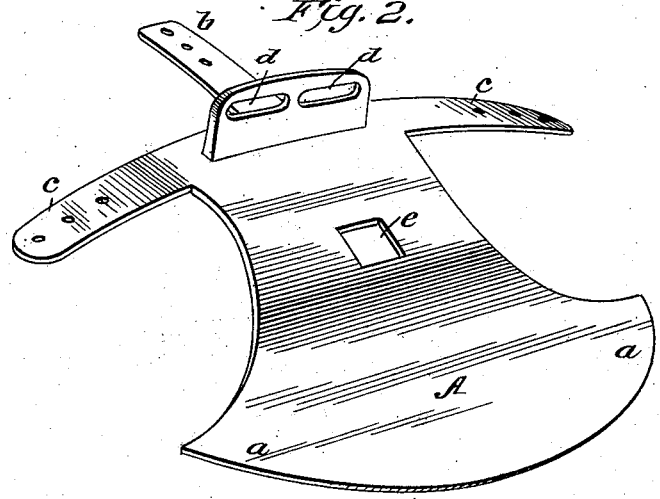

Figure 1 is a perspective view showing the device applied to the horse, and Fig. 2 is an enlarged detail view in perspective of the device attached.

In the drawings A represents the body of the device, which may be, as shown, a single sheet of stout leather made in the general shape of a saddle, or which may be made of some stiff and light open-work of any suitable material. The rear portion of the device has a broad rounded contour $a\ a$; and from the front there extends a tongue $b$, while from the forward part of the two sides there extend two other tongues $c\ c$. These tongues are perforated with a series of holes, and the front one $b$ is adapted to be connected by a buckle to the back strap of the harness, while the side tongues are similarly adapted to be connected to the two breeching straps. On the front portion of the body of the device there are mounted in elevated position guide loops $d\ d$, preferably made of metal, through which the reins are respectively passed and by which they are held in position. If desired, the body of the device may have one or more holes, as at $e$, to serve as a point of connection with the crupper, but this is not essential to the invention, and may be dispensed with.

In applying the device to a horse, it is connected to the harness as above indicated, and the curved line $a\ a$ is allowed to project down over the tail to a point a little short of the end of the bone or solid part of the tail. In this relation the broad and curved rear end of the device forms a guard or fender that prevents the horse's tail from being elevated in switching so that it cannot become entangled in the reins which are maintained in elevated position in the guide loops above.

I am aware that rein holders of various forms have been applied to the rear portion of the harness of a team, and I make no broad claim to this feature.

In some applications of my invention I may find that the tail guard is sufficient without the use of the elevated rein loops, and I may so use it if desired.

Having thus described my invention, what I claim as new, and desire to secure by Letters Patent, is—

1. The saddle shaped body A provided with a front tongue $b$ for connecting with the back-strap, side tongues $c\ c$ for the breech strap, and the broad curved guard surface $a\ a$ at its rear end, substantially as and for the purpose described.

2. The combined driving rein and tail holder, consisting of the body part A with front tongue $b$ for connecting with the back strap; side tongues $c\ c$ for the breech straps; the elevated rein holders $d$; and the broad curved guard surface $a\ a$ substantially as and for the purpose described.

BURDINE BLAKE.

Witnesses:
EDWD. W. BYRD,
SOLON C. KEMON.